(12) United States Patent
Zhang (10) Patent No.: US 10,948,138 B2
(45) Date of Patent: Mar. 16, 2021

(54) FILTER LENS, LED LAMP WITH FILTER LENS AND ILLUMINATION SYSTEM

(71) Applicants: Self Electronics Co., Ltd., Zhejiang (CN); Wanjiong Lin, Zhejiang (CN); Self electronics USA Corporation, Norcross, GA (US)

(72) Inventor: Sheng Zhang, Zhejiang (CN)

(73) Assignee: Seif Electronics Co., Ltd., Ningbo (CN)

( * ) Notice: Subject to any disclaimer, the term of this patent is extended or adjusted under 35 U.S.C. 154(b) by 210 days.

(21) Appl. No.: 16/142,638

(22) Filed: Sep. 26, 2018

(65) Prior Publication Data

US 2019/0093833 A1 Mar. 28, 2019

(30) Foreign Application Priority Data

Sep. 28, 2017 (CN) .......................... 201710897347.4

(51) Int. Cl.
*F21K 9/69* (2016.01)
*G03B 21/625* (2014.01)
(Continued)

(52) U.S. Cl.
CPC ................ *F21K 9/69* (2016.08); *F21V 5/002* (2013.01); *G02B 3/0037* (2013.01); *G02B 5/20* (2013.01);
(Continued)

(58) Field of Classification Search
CPC .. F21S 8/026; F21S 8/024; F21S 8/088; F21S 8/06; F21S 8/04; G09F 13/02;
(Continued)

(56) References Cited

U.S. PATENT DOCUMENTS 6,707,435 B1 * 3/2004 Merlato .............. F21V 23/0442
345/32
8,262,272 B2 * 9/2012 Cheng ...................... F21V 5/04
362/309

(Continued)

*Primary Examiner* — Diane I Lee
*Assistant Examiner* — Zachary J Snyder
(74) *Attorney, Agent, or Firm* — Wang Law Firm, Inc.

(57) ABSTRACT

A filter lens, an LED lamp with the filter lens, and an illumination system, the illumination system comprises an LED lamp with a filter lens, and an illuminated surface. The LED lamp with a filter lens comprises a light-emitting module, a collimating lens, and a filter lens, the filter lens comprises a light incident surface, and a light-emitting surface disposed on an opposite side of the light incident surface. The light incident surface comprises a plurality of irregular slot arranged end to end. Since the illumination system uses the LED lamp with a filter lens, and the filter lens of the LED lamp with the filter lens comprises the above-mentioned irregular slot, to adjust the positional relationship between the LED lamp with a filter lens and the illuminated surface. relative to the side of the illuminated surface that is closer to the LED lamp, the light directed to one side of the illuminated surface farther from the LED lamp can compensate for more attenuation due to reaching a distance from the LED lamp, it is possible to have substantially the same illuminance in which is near to or far from the LED lamp.

11 Claims, 6 Drawing Sheets

(51) Int. Cl.
  *G02B 3/00*    (2006.01)
  *F21V 5/00*    (2018.01)
  *G02B 5/20*    (2006.01)
  *G02B 27/30*   (2006.01)
  *F21W 131/103* (2006.01)
  *F21Y 115/10*  (2016.01)

(52) U.S. Cl.
  CPC ........... *G02B 27/30* (2013.01); *G03B 21/625* (2013.01); *F21W 2131/103* (2013.01); *F21Y 2115/10* (2016.08)

(58) Field of Classification Search
  CPC .... G02B 3/005; G02B 3/0043; G02B 3/0068; G02B 3/0037; G03B 21/208; F21V 5/008; F21V 5/02; F21V 7/0091
  See application file for complete search history.

(56) References Cited

U.S. PATENT DOCUMENTS

| | | | | |
|---|---|---|---|---|
| 9,239,141 B1* | 1/2016 | Schertler | ................... | F21V 5/04 |
| 9,360,169 B2* | 6/2016 | Zhang | ................ | G02B 19/0061 |
| 10,190,736 B1* | 1/2019 | Pyshos | .................... | F21S 8/026 |
| 10,344,940 B2* | 7/2019 | Gloss | ....................... | B60Q 1/20 |
| 2007/0258233 A1* | 11/2007 | Gray | ....................... | F21S 8/026 |
| | | | | 362/148 |
| 2010/0039819 A1* | 2/2010 | Fournier | ............ | G02B 26/0875 |
| | | | | 362/268 |
| 2011/0096553 A1* | 4/2011 | Shimokawa | ............... | F21V 5/04 |
| | | | | 362/311.02 |
| 2011/0280018 A1* | 11/2011 | Vissenberg | ........ | G02B 19/0009 |
| | | | | 362/277 |
| 2013/0120974 A1* | 5/2013 | Swisha | .................. | F21V 33/006 |
| | | | | 362/147 |
| 2014/0003040 A1* | 1/2014 | Holman | ............... | G02B 6/0046 |
| | | | | 362/147 |
| 2014/0071693 A1* | 3/2014 | Zhang | ....................... | F21V 5/04 |
| | | | | 362/309 |
| 2014/0112003 A1* | 4/2014 | Lacroix | ..................... | F21V 5/08 |
| | | | | 362/329 |
| 2015/0131310 A1* | 5/2015 | McCollum | ............ | G02B 6/005 |
| | | | | 362/606 |
| 2015/0226401 A1* | 8/2015 | Ferrier | .................. | F21V 7/0008 |
| | | | | 362/297 |
| 2016/0040840 A1* | 2/2016 | Gattari | .................... | F21V 5/002 |
| | | | | 362/328 |
| 2016/0245486 A1* | 8/2016 | Freier | ................ | G02B 27/0927 |
| 2017/0052314 A1* | 2/2017 | Speier | .................. | G02B 6/0068 |
| 2017/0254491 A1* | 9/2017 | Terumichi | ................. | F21V 7/06 |

* cited by examiner

FILTER LENS, LED LAMP WITH FILTER LENS AND ILLUMINATION SYSTEM

CROSS-REFERENCE TO A RELATED APPLICATION

This application claims priority to a Chinese Patent Application No. CN 201710897347.4, filed on Sep. 28, 2017.

FIELD OF THE TECHNOLOGY

The present invention relates to lighting field, with particular emphasis on a filter lens, LED lamp with filter lens and illumination system.

BACKGROUND

In general daily life, various lighting devices can be seen everywhere, such as fluorescent lamps, street lamps, table lamps, art lamps, and the like. In the above lighting apparatus, a tungsten filament bulb is conventionally used as a light source. In recent years, due to the rapid development of technology, light-emitting diodes (LEDs) have been used as sources of illumination. In addition, in addition to lighting equipment, for general traffic signs, billboards, lights, etc., also use LEDs as a light source. As described above, the light-emitting diode as a light-emitting source is power-saving and with greater brightness, and it has been gradually standardized in use.

With the popularity of LED lamps, more and more occasions have begun to use LED lamps. In some areas of accent lighting, the lighting range of LED luminaires often needs to be adjusted according to actual needs. For example, in some wall washers, there are often disadvantages such as being bright in the vertical direction near the lamp and dark in the farther place away from the lamp, or the lighting range is too small in the horizontal direction due to the illuminance being too concentrated.

SUMMARY OF THE INVENTION

Therefore, the present invention provides a filter lens, LED lamp having the filter lens, and illumination system that is capable of uniformizing brightness in an irradiation range and expanding the irradiation range to solve the above problem.

A filter lens comprises a light incident surface, and a light-emitting surface disposed on an opposite side of the light incident surface, the light incident surface comprises a plurality of irregular slot which are connected end to end and arranged in sequence, in a section perpendicular to the extending direction of the irregular slot, the outline of each of the irregular slots comprises a irregular slot optical axis, a concave lens on the side of the irregular slot optical axis, and a convex lens on the other side of the irregular slot optical axis, two end points of the outline of each of the irregular slot are connected in a line in a section perpendicular to the extending direction of the irregular slot, the irregular slot optical axis intersects with the line in the arrangement direction of the irregular slot and forms an intersection, the distance between the intersection and one of the two end points of the contour line of the irregular slot is decremented, and the light-emitting surface comprises a plurality of curved strips which are connected end to end and arranged in sequence, the extending direction of the curved strip is perpendicular to the extending direction of the irregular slot, in a section perpendicular to the extending direction of the curved strip 149, the contour line of each of the curved strips is curved.

Advantageously, the contour line of the plurality of irregular slot is a smooth curve on a section perpendicular to the extending direction of the irregular slot.

Advantageously, the irregular slot and the curved strip extend in a straight line.

Advantageously, in a section perpendicular to the extending direction of the curved strip, the contour line of the plurality of curved strip is a non-smooth curve formed by a circular arc.

Advantageously, the light-emitting surface further comprises an adjustment slot, and the extending direction of the adjustment slot is parallel to the extending direction of the curved strip.

An LED lamp with a filter lens, the LED lamp with a filter lens comprises a light-emitting module, a collimating lens disposed in a light-emitting direction of the light-emitting module, and one filter lens disposed in the light-emitting direction of the collimating lens, wherein the light-emitting module comprises an optical axis, and the emergent light of the collimating lens is parallel light, the light incident surface of the filter lens receives the emergent light of the collimating lens.

Advantageously, the light-emitting module comprises at least one LED chip.

Advantageously, the optical axis is perpendicular to a plane formed by the extending direction and the arrangement direction of the irregular slot.

An illumination system, the illumination system comprises an LED lamp with a filter lens as described above, and an illuminated surface illuminated by the LED lamp having a filter lens, the angle between the optical axis and the illuminated faces comprises an acute angle, and the acute angle is between 20 and 70 degrees, and the extending direction of the plurality of irregular slot of the filter lens is parallel to the illuminated surface, and the emergent light of the irregular slot optical axis on the side with the smallest distance from the end of concave lens of the contour line of the irregular slot is directed to the illuminated surface farther from the LED lamp, the emergent light of the irregular slot optical axis on the side with the largest distance from the end of concave lens of the contour line of the irregular slot is directed to the illuminated surface closer to the LED lamp.

Advantageously, wherein the illuminated surface is perpendicular to the ground plane with reference to the ground plane, the extending direction of the irregular slot of the filter lens is parallel to the illuminated surface and perpendicular to the ground plane.

Compared with the prior art, since the illumination system uses the LED lamp with a filter lens, and the filter lens of the LED lamp with the filter lens comprises the above-mentioned irregular slot and curved strip, and by setting the positional relationship between the LED lamp with a filter lens and the illuminated surface. relative to the side of the illuminated surface that is closer to the LED lamp, the light directed to one side of the illuminated surface farther from the LED lamp can compensate for more attenuation due to reaching a distance from the LED lamp, it is possible to have substantially the same illuminance in which is near to or far from the LED lamp.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
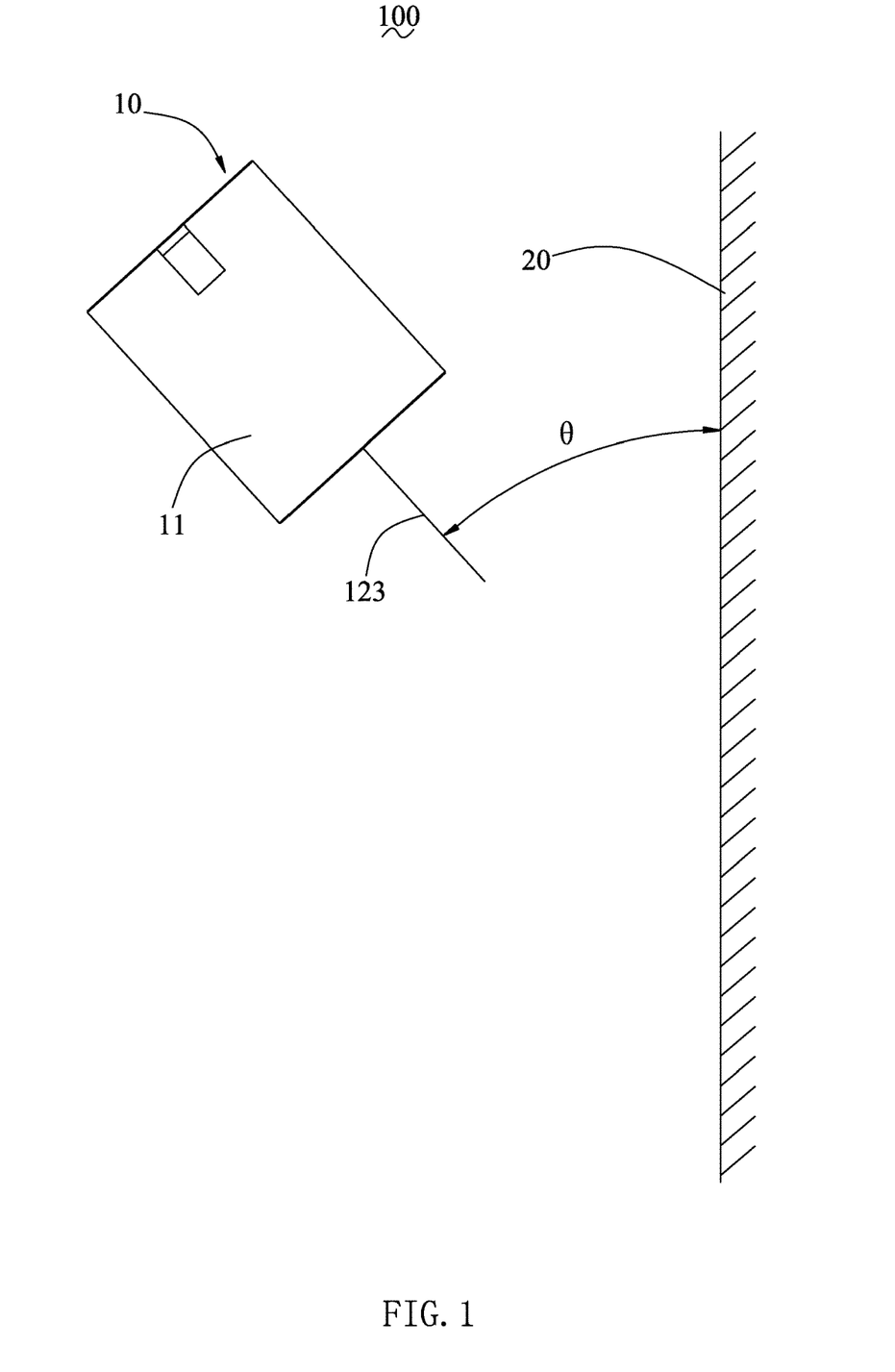
FIG. 1 is a schematic structural view of an illumination system provided by the present invention.
Figure 2:
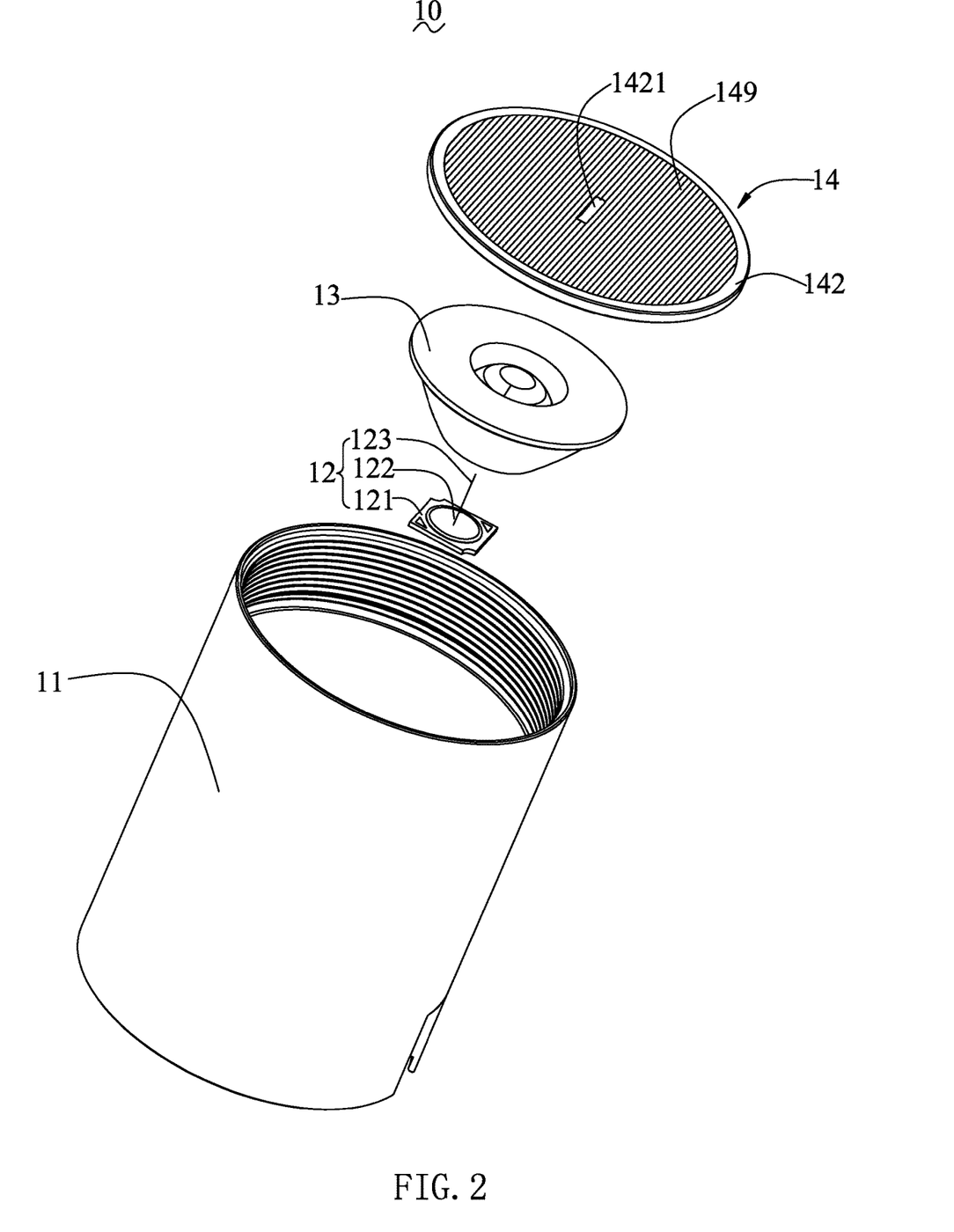
FIG. 2 is a schematic diagram of the exploded structure of the LED lamp with filter lens comprised in the illumination system of FIG. 1.

Please referring to FIG. 1 to FIG. 2, It is a schematic structural diagram of an illumination system 100 provided by the present invention. The illumination system 100 comprises an LED lamp 10 having a filter lens and an illuminated surface 20 illuminated by the LED lamp 10 having a filter lens. In practical applications, the LED lamp 10 with a filter lens may be several, and it would be determined according to the size or the number of the illuminated surface 20. In the present embodiment, only the detailed description of the present invention is shown, so that only one LED lamp 10 with a filter lens and an illuminated surface 20 corresponding to the LED lamp 10 with the filter lens are shown. It is conceivable that the illumination system 100 further comprises other components, such as a cabinet, components for setting the ceiling, socket, track and the like with the filter lens 14, and power supply for the LED lamp 10 with the filter lens, and the like, because components such as these are not the focus of the present invention and will not be described herein.

The LED lamp 10 with a filter lens comprises a lamp cylinder 11, a light-emitting module 12 disposed in the lamp cylinder 11, a collimating lens 13 disposed in a light-emitting direction of the light-emitting module 12, and a filter lens 14 is disposed in the light-emitting direction of the collimating lens 13. It is to be understood that the LED lamp with the filter lens further comprises other modules, such as an electrical plug component, a power module, etc., which are well-known technologies of those skilled in the art, and are not described herein again.

The lamp cylinder 11 can be a circular or square cylinder, and its specific shape depends on actual needs. In this embodiment, the lamp cylinder 11 is a circular cylinder. It can be understood that, in order to set the light-emitting module 12, the collimating lens 13, and the filter lens 14 and the like, the lamp cylinder 11 further comprises mechanical structures such as brackets, retaining rings, dams, screws, and mounting, and parts such as pots, which should be understood by those skilled in the art, it will not be described in detail herein.

The light-emitting module 12 comprises a circuit board 121 and at least one LED chip 122 disposed on the circuit board 121. The circuit board 121 can be a printed circuit board that is used to provide compliant power to the LED chip 122. It is conceivable that electronic components such as diodes and transistors are electrically connected to the circuit board 121 to convert the commercial power into a voltage or current suitable for the operation of the LED chip 122. The number of the LED chip 122 depends on actual needs, such as the magnitude of the luminescence. In the present embodiment, for the purpose of illustrating the present invention, the light-emitting module 12 has one LED chip 122. The LED (Light Emitting Diode) chip 122 is a solid-state semiconductor device capable of converting electrical energy into visible light, and that it is also a prior art that the LED chip can directly convert electricity into light energy. The light-emitting module 12 further comprises an optical axis 123. It is well known that each LED chip 122 has an optical axis that is optically oriented, i.e., the optical design should be referenced to the optical axis. Therefore, the optical axis of the LED chip 122 is also the optical axis 123 of the light-emitting module 12.

The collimating lens 13 is used to regulate incident light into parallel light. Since the emergent light of the LED chip 122 is a hemispherical shape, that is, a spherical surface formed by rotating the light emitting range of 180 degrees into a plane of 180 degrees. If the LED chip 122 is used as a point light source, the exiting light is divergent light in any one of the sections passing through the LED chip 122. Therefore, in order to align the divergent light or change the light outgoing direction, the collimating lens 13 is required to convert the divergent light as incident light into parallel light as the emergent light. As for the specific structure of the collimating lens 13, it should be a prior art, such as the patent number CN201110267362.3, a lens disclosed in the patent name of an LED lamp lens, which can convert the divergent light emitted by the LED chip into parallel light. Therefore, the specific structure and the principle of illumination of the collimating lens 13 will not be described herein.

The filter lens 14 is disposed in a light-exiting direction of the collimating lens 13, and comprises a light incident surface 141 for receiving parallel light emitted from the collimating lens 13, and a light-emitting surface 142 is disposed opposite to the light incident surface 141. It should be understood that the filter lens 14 further comprises other functional structures, such as a mounting edge, and it is not described in detail herein.

Figure 3:
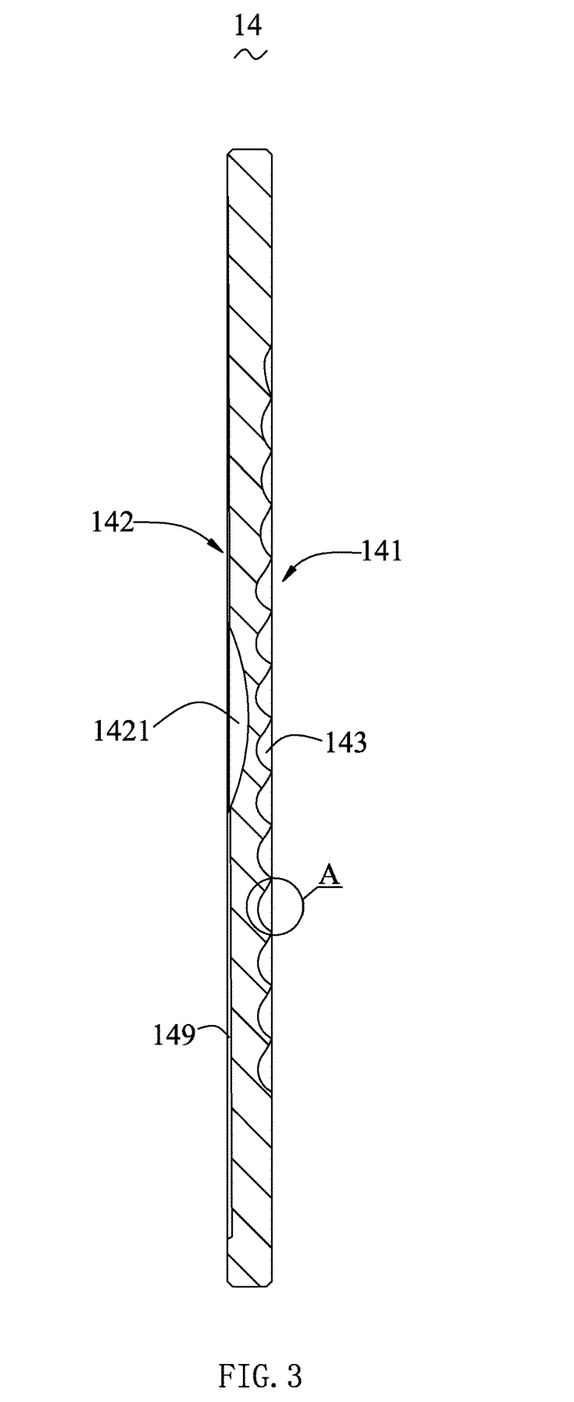
FIG. 3 is a cross-sectional structural view of the filter lens comprised in the LED lamp with a filter lens of FIG. 2.
Figure 4:
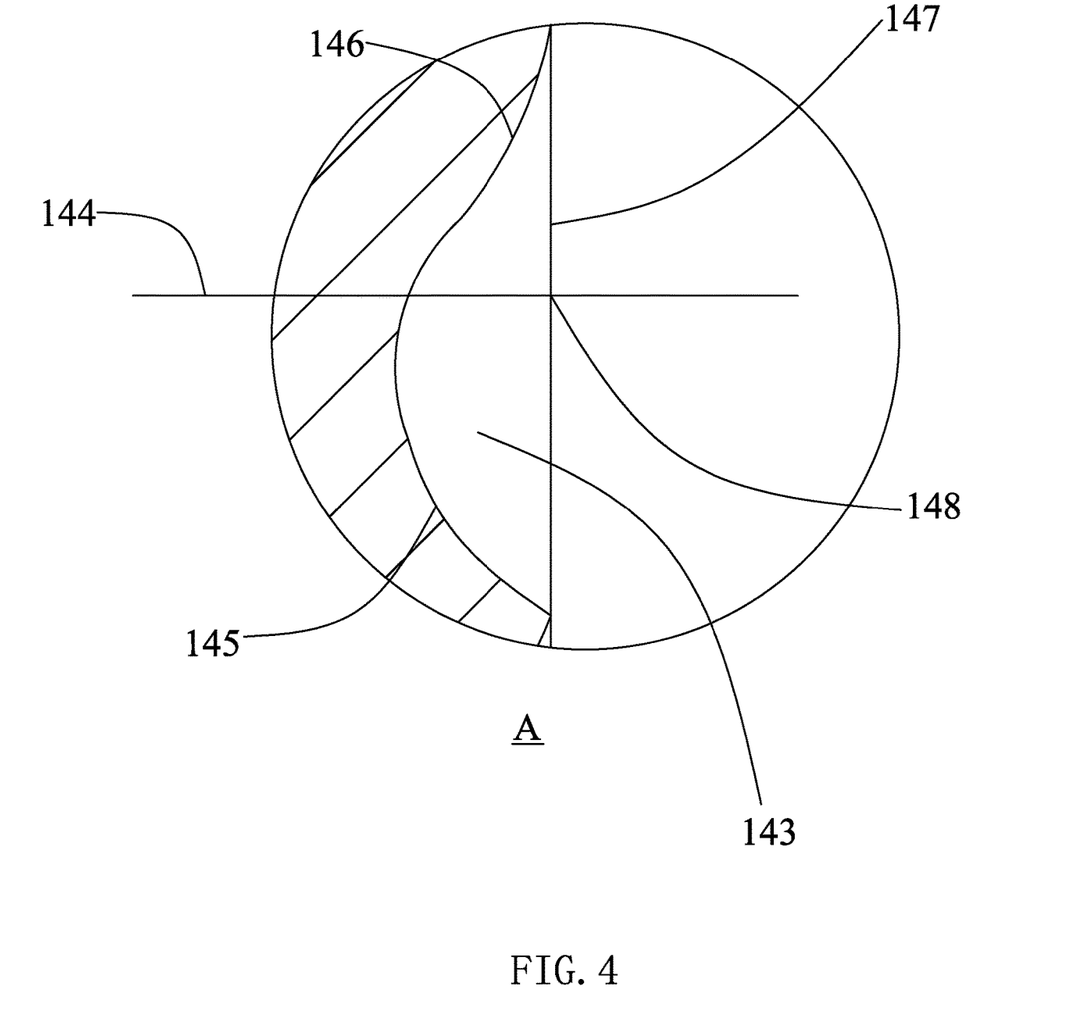
FIG. 4 is a partial enlarged view of the filter lens of FIG. 3 at A.

Referring to FIG. 3 and FIG. 4 together, the light incident surface 141 comprises a plurality of irregular slot 143 which are connected end to end and arranged in sequence. In a section perpendicular to the extending direction of the irregular slot 143, the outline of each of the irregular slots 143 comprises a irregular slot optical axis 144, a concave lens 145 on the side of the irregular slot optical axis 144, and a convex lens 146 on the other side of the irregular slot optical axis 144. The irregular slot optical axis 144 is also a virtual straight line that has the same function as the optical axis of LED chip in the prior art, i.e., for optical design, i.e., as a boundary between the concave lens 145 and the convex lens 146. The contour line of the concave lens 145 and the contour line of the convex lens 146 are smooth curves on the irregular slot optical axis 144, and the contour lines of the two adjacent irregular slot 143 are also smooth at the joint, so that the outline of the plurality of irregular slot 143 is a smooth curve on a section perpendicular to the extension direction of the irregular slot 143. The plurality of irregular slot 143 has a similar structure, the difference lies in the position of the irregular slot optical axis 144. In order to define the position of the respective irregular slot optical axis 144 of the plurality of irregular slot 143, the following geometry is introduced. The two end points of the outline of each of the irregular slot 143 are connected in a line 147 in a section perpendicular to the extending direction of the irregular slot 143. At the same time, the irregular slot optical axis 144 intersects with the line 147 in the direction in which the irregular slot 143 are arranged and forms an intersection 148. The distance between the intersection 148 and one of the two end points of the contour line of the irregular slot 143 is decremented. It is of course conceivable that when the distance between the intersection 148 and one of the two end points of the contour line of the irregular slot 143 is decreased, the distance between the intersection 148 and the other of the two end points of the contour line of the irregular slot 143 is incremented. In the present embodiment, for the sake of exemplification, the distance between the intersection 148 and the end point of the concave lens 145 of the contour line of the irregular slot 143 is decreased. Due to the parallel light received by the light incident surface 141, the processing of the light by the concave lens 145 and the convex lens 146 conforms to its basic characteristics, that is, the concave lens 145 disperses the parallel light, and the convex lens 146 aggregates the parallel light. When the distance between the intersection 148 and the end point of the concave lens 145 of the contour line of the irregular slot 143 is decreased, the parallel light obtained by the concave lens 145 will be less and less along the arrangement direction of the irregular slot 143 while the parallel light obtained by the convex lens 146 will be more and more. The extending direction of the irregular slot 143 and the arrangement direction of the irregular slot 143 will be perpendicular, and the irregular slot 143 extends in a straight line. It can be understood that the extending direction and the arrangement direction of the irregular slot 143 constitute a plane in which the light incident surface 141 is located. When the filter lens 14 is mounted, the optical axis 123 of the light-emitting module 12 should be perpendicular to the plane formed by the extending direction and the arrangement direction of the irregular slot 143.

Figure 5:
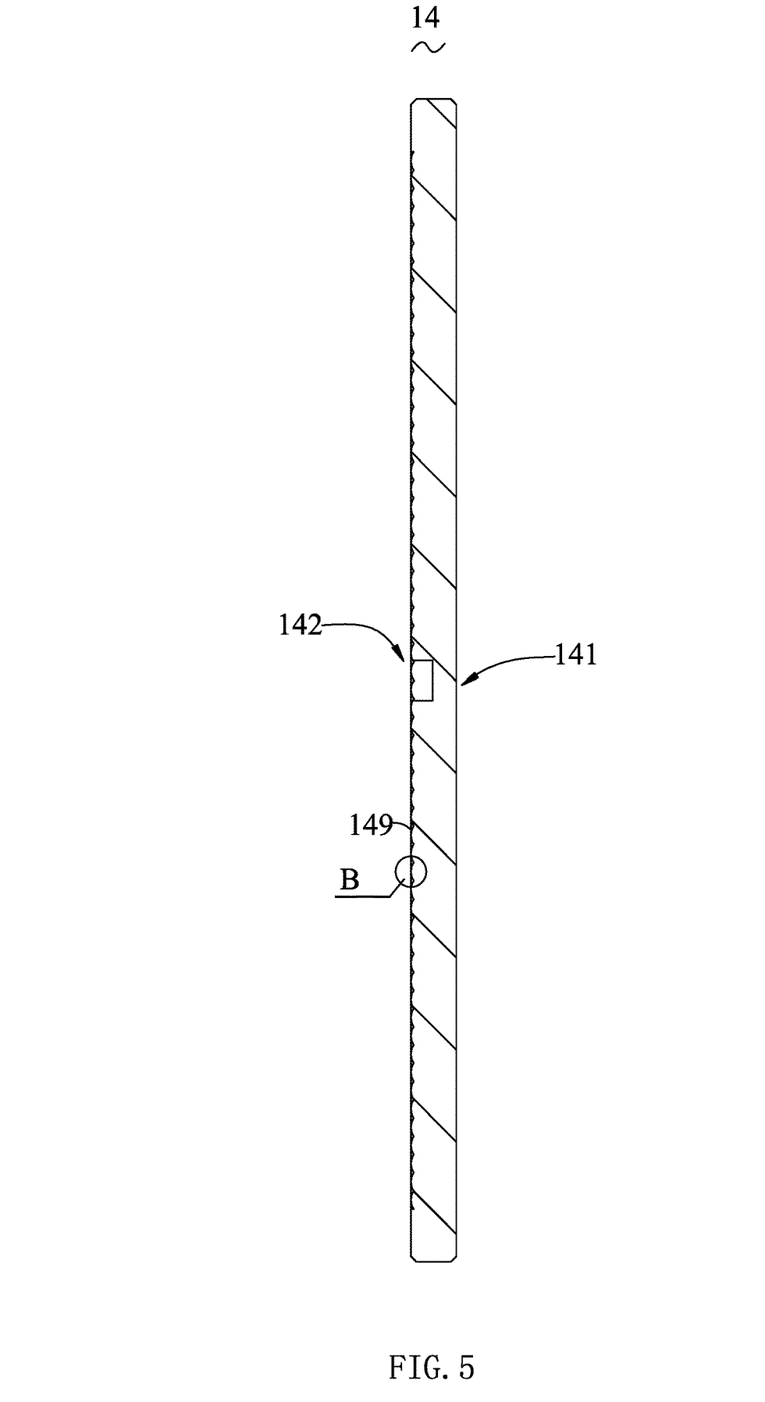
FIG. 5 is a cross-sectional structural view showing another angle of the filter lens comprised in the LED lamp with the filter lens of FIG. 2.
Figure 6:
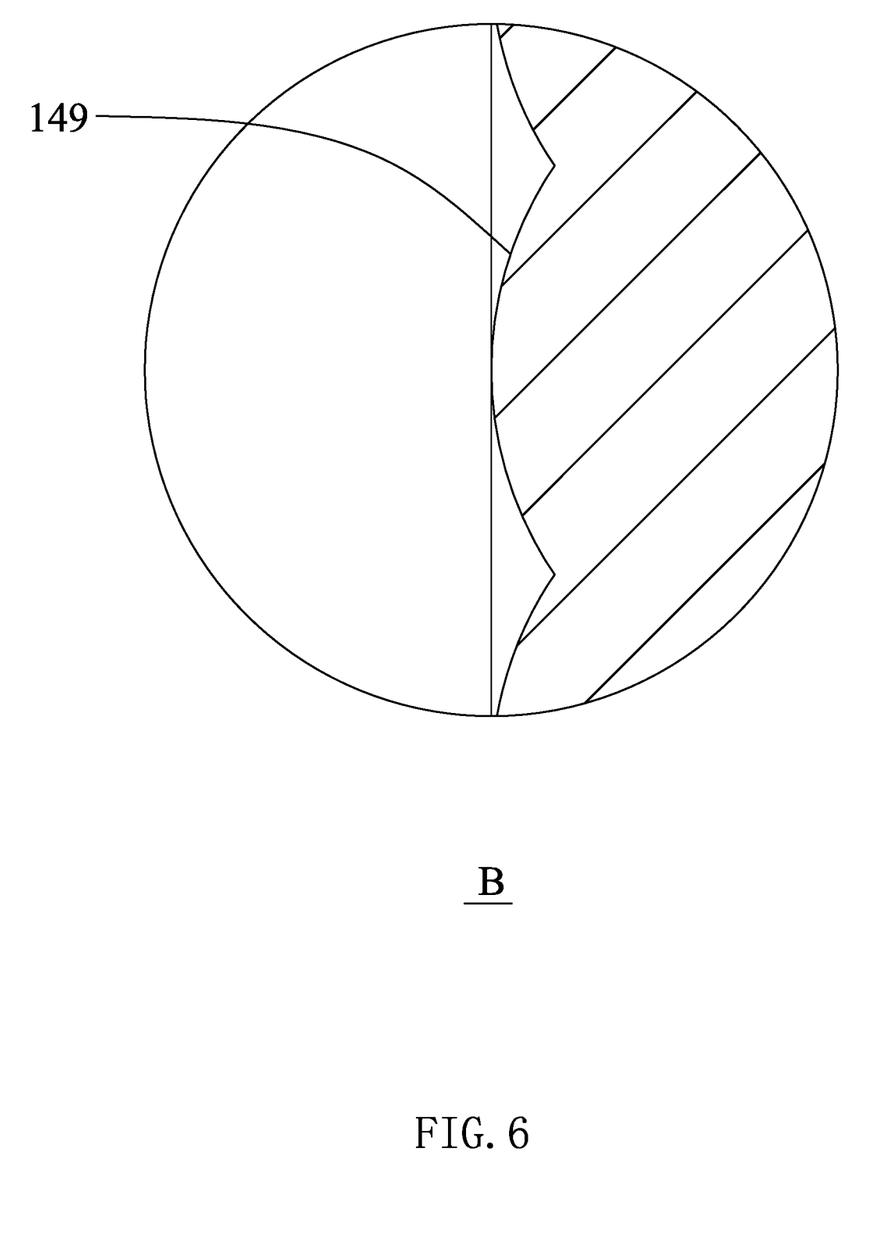
FIG. 6 is a partial enlarged view of the filter lens of FIG. 4 at B.

Referring to FIG. 5 and FIG. 6 together, the light-emitting surface 142 comprises a plurality of curved strips 149 which are connected end to end and arranged in sequence. The extending direction of the curved strip 149 is perpendicular to the extending direction of the irregular slot 143, and the curved strip 149 is also extended in a straight line. In a section perpendicular to the extending direction of the curved strip 149, the contour line of each of the curved strips 149 is curved, and the contour lines of the plurality of curved strip 149 form a non-smooth curve formed by a circular arc. It can be understood that, in a section perpendicular to the extending direction of the curved strip 149, the curved outline of the curved strip 149 forms a curve which may be alternately formed by the convex lens and the concave lens, or may be a non-smooth curve which may be formed by only the convex lens or only the concave lens. In the present embodiment, the curved strip 149 is composed only of convex lenses. However, whether it is a convex lens or a concave lens, since the light emitted from the light incident surface 141 is no longer parallel light, and the illuminated surface 20 is not disposed at its focal point, the light emitted from the light incident surface 141 is dispersed along the arrangement direction of the irregular slot 143, so that the irradiation range of the light-emitting surface 142 along the arrangement direction of the irregular slot 143 can be enlarged.

The filter lens 14 further comprises an adjustment slot 1421 disposed on the light-emitting surface 142. The extending direction of the adjustment slot 1421 is parallel to the extending direction of the curved strip. The adjustment slot 1421 is used to adjust the positional relationship between the extending direction of the curved strip 149 of the filter lens 14 and the illuminated surface 20 when the LED lamp 10 with the filter lens is mounted, details will be provided below. Because the adjustment slot 1421 is only used to adjust the position, the width of the adjustment slot 1421 can be very small, as equivalent to the thickness of the "one" screwdriver.

The illuminated surface 20 is a position where the LED lamp 10 with the filter lens is irradiated, and it may be a flat surface or a curved surface. In the present embodiment, the present invention is merely exemplified, and the illuminated surface 20 is a flat surface. The illuminated surface 20 may be an item such as a picture to be illuminated in a museum, or may be the merchandise in a window in a shopping mall. For the sake of simplicity, the illuminated surface 20 is perpendicular to the ground plane with reference to the ground plane. When the LED lamp 10 is actually mounted, the extending direction of the irregular slot 143 of the filter lens 14 is parallel to the illuminated surface 20 and the ground plane. Therefore, the arrangement direction of the irregular slot 143 of the filter lens 14 is perpendicular to the ground plane. The LED lamp 10 with a filter lens is generally used in the field such as wall washer light, but not in accent lighting. Therefore, the angle between the optical axis 123 of the light-emitting module 12 of the LED lamp 10 with the filter lens and the illuminated faces 20 should comprise an acute angle θ, and the acute angle θ is between 20 and 70 degrees.

The optical principle of the filter lens 14 will be described below with an application example in which the arrangement direction of the plurality of irregular slot 143 of the filter lens 14 is parallel to the illuminated surface 20 and perpendicular to the ground plane. Meanwhile, since the distance between the intersection 148 of the irregular slot optical axis 144 and the line 147 and the end point of the concave lens 145 of the contour line of the irregular slot 143 is decreased, when the LED lamp 10 with the filter lens is mounted, the emergent light of the irregular slot optical axis 144 on the side with the smallest distance from the end of concave lens 145 of the contour line of the irregular slot 143 should be directed to the illuminated surface 20 farther from the LED lamp 10, the emergent light of the irregular slot optical axis 144 on the side with the largest distance from the end of concave lens 145 of the contour line of the irregular slot 143 should be directed to the illuminated surface 20 closer to the LED lamp 10. Since the concave lens 145 of the contour line of the irregular slot 143 has a diverging effect on the light, the divergent light is directed to the side of the illuminated surface 20 which is close to the LED lamp 10. At the same time, the convex lens 146 of the contour line of the irregular slot 143 has a polymerization effect on the light, and the polymerization light is directed to the side of the illuminated surface 20 far from the LED lamp 10. Of course, the above divergence and polymerization are decreasing or increasing along the arrangement direction of the irregular slot 143 so that relative to the side of the illuminated surface 20 that is closer to the LED lamp 10, the light directed to one side of the illuminated surface 20 farther from the LED lamp 10 can compensate for more attenuation due to reaching a distance from the LED lamp 10. that is, one side of the illuminated surface 20 that is farther from the LED lamp 10 and the other side of the illuminated surface 20 that is closer to the LED lamp 10, in the same irradiation area, the side of the illuminated surface 20 farther from the LED lamp 10 obtains more light than the side of the illuminated surface 20 that is closer to the LED lamp 10, so that more light can be obtained to compensate for more attenuation due to reaching farther away from the LED lamp 10. Further, it is possible to have substantially the same illuminance in which is near to or far from the LED lamp 10. Here, it is necessary to explain the meaning of "substantially the same", which is basically the same, that is, although the illuminance value may not be exactly the same on both sides of the illuminated surface 20 which is farther or closer to the LED lamp 10 by the illuminance meter, It is difficult for human eyes to perceive this difference, so that the illumination effect of the illuminated surface 20 is consistent for people's vision.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. A filter lens, characterized in that: the filter lens comprises a light incident surface, and a light-emitting surface disposed on an opposite side of the light incident surface, the light incident surface comprises a plurality of irregular slot which are connected end to end and arranged in sequence, in a section perpendicular to the extending direction of the irregular slot, the outline of each of the irregular slots comprises an irregular slot optical axis, a concave lens on the side of the irregular slot optical axis, and a convex lens on the other side of the irregular slot optical axis, two end points of the outline of each of the irregular slot are connected in a line in a section perpendicular to the extending direction of the irregular slot, the irregular slot optical axis intersects with the line in the arrangement direction of the irregular slot and forms an intersection, and each irregular slot comprises a distance between the intersection and one of the two end points of the contour line of the irregular slot, and that each distance is decremented, relative to the immediately adjacent irregular slot, when moving along the direction that is perpendicular to the extending direction of the irregular slot, and the light-emitting surface comprises a plurality of curved strips which are connected end to end and arranged in sequence, the extending direction of the curved strip is perpendicular to the extending direction of the irregular slot, in a section perpendicular to the extending direction of the curved strip, the contour line of each of the curved strips is curved.

2. The filter lens as claimed in claim 1, wherein the contour line of the plurality of irregular slot is a smooth curve on a section perpendicular to the extending direction of the irregular slot.

3. The filter lens as claimed in claim 1, wherein the irregular slot and the curved strip extend in a straight line.

4. The filter lens as claimed in claim 1, wherein in a section perpendicular to the extending direction of the curved strip, the contour line of the plurality of curved strip is a non-smooth curve formed by a circular arc.

5. The filter lens as claimed in claim 1, wherein the light-emitting surface further comprises an adjustment slot, and the extending direction of the adjustment slot is parallel to the extending direction of the curved strip.

6. An LED lamp with a filter lens, characterized in that: the LED lamp with a filter lens comprises a light-emitting module, a collimating lens disposed in a light-emitting direction of the light-emitting module, and one filter lens according to any one of claims 1 to 5 claim 1 disposed in the light-emitting direction of the collimating lens, wherein the light-emitting module comprises an optical axis, and the emergent light of the collimating lens is parallel light, the light incident surface of the filter lens receives the emergent light of the collimating lens.

7. The LED lamp with a filter lens as claimed in claim 6, wherein the light emitting module comprises at least one LED chip.

8. The LED lamp with a filter lens as claimed in claim 6, wherein the optical axis is perpendicular to a plane formed by the extending direction and the arrangement direction of the irregular slot.

9. An illumination system, characterized in that the illumination system comprises an LED lamp with a filter lens according to any one of claims 6 to 8 claim 6, and an illuminated surface illuminated by the LED lamp having a filter lens, the angle between the optical axis and the illuminated faces comprises an acute angle, and the acute angle is between 20 and 70 degrees, and the extending direction of the plurality of irregular slot of the filter lens is parallel to the illuminated surface, and the emergent light of the irregular slot optical axis on the side with the smallest distance from the end of concave lens of the contour line of the irregular slot is directed to the illuminated surface farther from the LED lamp, the emergent light of the irregular slot optical axis on the side with the largest distance from the end of concave lens of the contour line of the irregular slot is directed to the illuminated surface closer to the LED lamp.

10. The illumination system as claimed in claim 9, wherein the illuminated surface is perpendicular to the ground plane with reference to the ground plane, the extending direction of the irregular slot of the filter lens is parallel to the illuminated surface and perpendicular to the ground plane.

11. An LED lamp with a filter lens as claimed in claim 6, wherein the contour line of the plurality of irregular slots is a smooth curve on a section perpendicular to the extending direction of the irregular slot.

* * * * *